United States Patent
Dalmatov et al.

(10) Patent No.: US 11,347,407 B2
(45) Date of Patent: May 31, 2022

(54) RAID (REDUNDANT ARRAY OF INDEPENDENT DISKS) GROUP CONFIGURATION AND STORAGE DRIVE DISTRIBUTION BASED ON STORAGE DRIVE HEALTH

(71) Applicant: EMC IP Holding Company LLC, Hopkinton, MA (US)

(72) Inventors: Nickolay Dalmatov, Saint Petersburg (RU); Mikhail Danilov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/038,645

(22) Filed: Sep. 30, 2020

(65) Prior Publication Data
US 2021/0286528 A1 Sep. 16, 2021

(30) Foreign Application Priority Data
Mar. 13, 2020 (RU) .......................... RU2020110747

(51) Int. Cl.
*G06F 3/06* (2006.01)
*G06F 11/14* (2006.01)

(52) U.S. Cl.
CPC .......... *G06F 3/0619* (2013.01); *G06F 3/0629* (2013.01); *G06F 3/0647* (2013.01); *G06F 3/0653* (2013.01); *G06F 3/0659* (2013.01); *G06F 3/0689* (2013.01)

(58) Field of Classification Search
None
See application file for complete search history.

(56) References Cited

U.S. PATENT DOCUMENTS

| | | | | |
|---|---|---|---|---|
| 9,892,014 B1* | 2/2018 | Hickey | ................ | G06F 3/0616 |
| 10,013,323 B1 | 7/2018 | Puhov et al. | | |
| 10,229,022 B1 | 3/2019 | Gao et al. | | |
| 11,042,324 B2 | 6/2021 | Shveidel et al. | | |
| 2004/0267708 A1* | 12/2004 | Rothman | ............ | G06F 11/2284 |
| 2005/0182992 A1* | 8/2005 | Land | .................... | G06F 3/0689 |
| | | | | 714/701 |

\* cited by examiner

*Primary Examiner* — Michael Alsip
(74) *Attorney, Agent, or Firm* — BainwoodHuang

(57) ABSTRACT

Drive health information is collected for each one of the data storage drives in one or more RAID groups of data storage drives, and is used to calculate a faultiness level of each data storage drive in the RAID group(s). A suitable RAID level for configuration of at least one RAID group may be generated based on the faultiness levels of the data storage drives contained in the RAID group. A faultiness-balanced distribution of the data storage drives across multiple RAID groups may be generated based on the faultiness levels of individual data storage drives. The data storage drives may be automatically redistributed across the multiple RAID groups according to the faultiness-balanced distribution of the data storage drives.

15 Claims, 4 Drawing Sheets

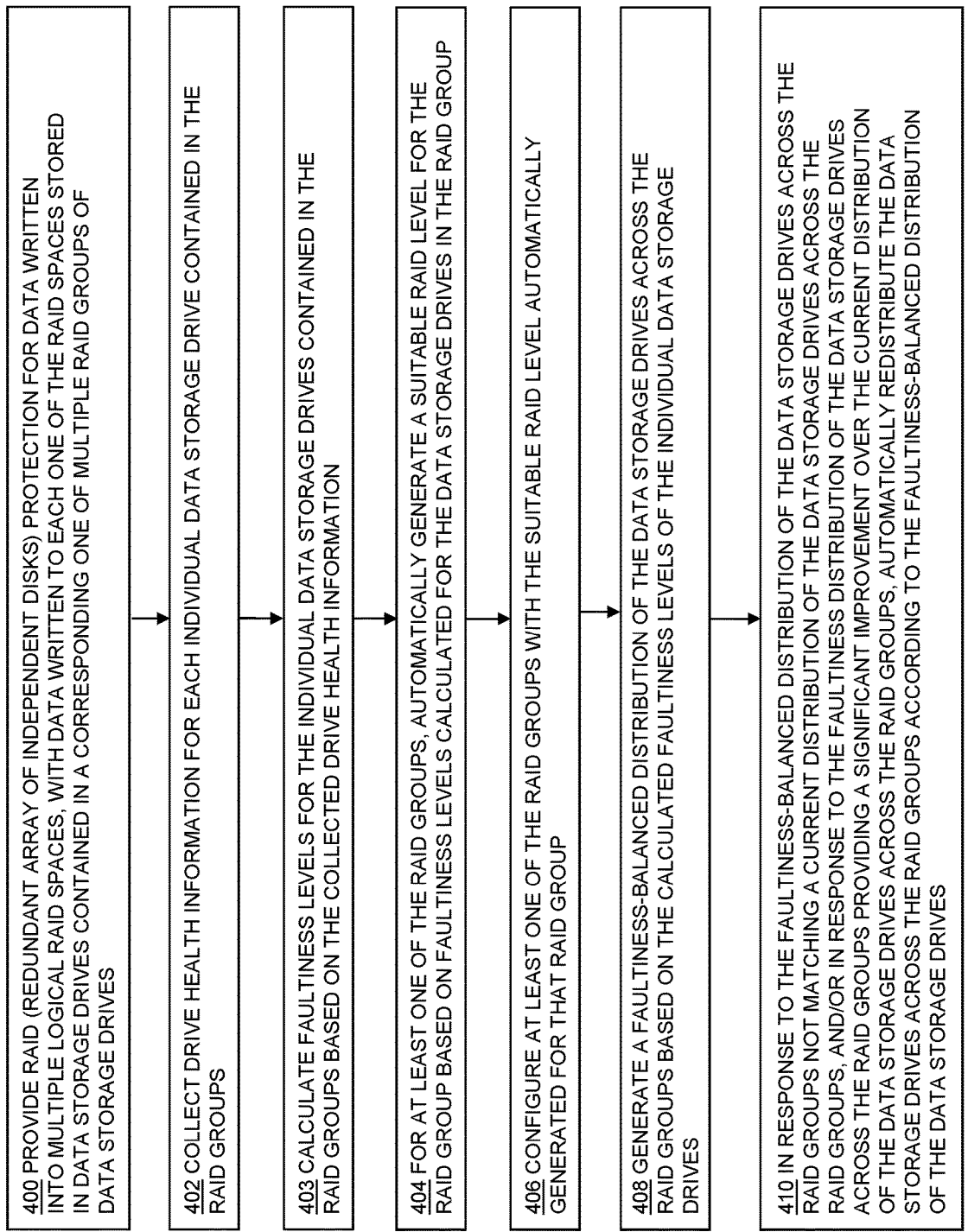

RAID (REDUNDANT ARRAY OF INDEPENDENT DISKS) GROUP CONFIGURATION AND STORAGE DRIVE DISTRIBUTION BASED ON STORAGE DRIVE HEALTH

RELATED APPLICATIONS

This application claims priority to Russian Patent Application number 2020110747, filed in the Russian Patent Office on Mar. 13, 2020, entitled RAID (REDUNDANT ARRAY OF INDEPENDENT DISKS) GROUP CONFIGURATION AND STORAGE DRIVE DISTRIBUTION BASED ON STORAGE DRIVE HEALTH, the entire contents of which is hereby incorporated herein by reference.

TECHNICAL FIELD

The present disclosure relates generally to intelligent data storage systems that provide RAID (Redundant Array of Independent Disks) data protection, and more specifically to technology for configuring RAID groups and distributing data storage drives across RAID groups based on health information collected from individual data storage drives.

BACKGROUND

Data storage systems are arrangements of hardware and software that may include one or more storage processors coupled to non-volatile data storage drives, such as solid state drives and/or magnetic disk drives. The storage processors service host I/O operations received from physical and/or virtual host machines ("hosts"). The I/O operations may specify one or more storage objects (e.g. logical disks or "LUNs") hosted by the storage system that are written to and read from by the hosts. The storage processors store and execute software that manages incoming I/O operations and performs various data processing tasks to organize and secure host data that is received from the host machines and stored on the non-volatile data storage drives.

Some data storage systems provide RAID (Redundant Array of Independent Disks) technology. RAID is a data storage virtualization/protection technology that combines multiple physical drives that are contained in a RAID group into a single logical unit of non-volatile storage in order to provide data redundancy and/or performance improvement. Data may be distributed across the drives in the RAID group using one of several RAID technologies, referred to as RAID levels, each of which may provide a different level of redundancy and/or performance. Some RAID levels employ data striping ("striping"). In general, striping involves segmenting received host data into logically sequential blocks (e.g. sequential blocks in a logical address space of a logical storage object), and then storing data blocks written to consecutive blocks in the logical sequence of blocks onto different drives of the RAID group. A series of consecutive logically sequential data blocks that are stored across different drives in the RAID group is referred to as a RAID "stripe". By spreading data segments across multiple drives that can be accessed concurrently, total data throughput can be increased.

Some RAID levels employ a "parity" error protection scheme to provide fault tolerance. When parity protection is used, one or more parity blocks are additionally maintained in each stripe. For example, a parity block for a stripe may be maintained that is the result of performing a bitwise exclusive "OR" (XOR) operation across the data blocks of the stripe. When the storage for a data block in the stripe fails, e.g. due to a drive failure, the lost data block can be recovered by performing an XOR operation across the remaining data blocks and the parity block. Parity blocks may be distributed across all of the drives in the RAID group, or all stored on a drive that is dedicated to storing parity data. Other levels of RAID protection provide fault tolerance by maintaining mirror copies of data on multiple drives.

One example of a RAID level that uses block level striping with distributed parity error protection is 4D+1P ("four data plus one parity") RAID-5. In 4D+1P RAID-5, each stripe consists of 4 data blocks and a block of parity information. In a 4D+1P RAID-5 RAID group, at least five storage disks are used to store the data and parity information, so that each one of the four data blocks and the parity information for each stripe can be stored on a different disk. A spare disk may also be kept available to handle disk failures. In the event that one of the disks fails, the data stored on the failed disk can be rebuilt onto the spare disk by performing XOR operations on the remaining data blocks and the parity information on a per-stripe basis. 4D+1P RAID-5 is generally considered to be effective in preventing data loss in the case of single disk failures. However, data may be lost when two or more disks fail concurrently.

Other RAID levels may provide a higher level of data protection, e.g. data protection even in the event that multiple disks fail concurrently. For example, 4D+2P RAID-6 provides striping with double distributed parity information that is provided on a per-stripe basis. The double parity information maintained by 4D+2P RAID-6 enables data protection for up to a maximum of two concurrently failing drives.

Examples of RAID levels that provide fault tolerance by maintaining mirror copies of data across multiple data storage drives include RAID-1 and RAID-10.

SUMMARY

At any given point in time during the operation of a data storage system, each individual data storage drive in a RAID group used to provide some level of RAID protection has its own level of health. For example, over time, individual data storage drives may exhibit their own specific levels of faultiness in terms of faultiness parameters such as read operation errors, seek operations errors, relocated sectors, decreasing throughput performance, program/erase operation failures, and/or other types of faultiness parameters. In general, the level of faultiness for an individual data storage drive may represent a probability that the data storage drive will fail in the future.

The level of faultiness of each individual data storage drive may change over time. For example, the level of faultiness of a data storage drive may increase as the data storage drive ages and/or experiences increased utilization. As the level of faultiness of a data storage drive increases, the drive becomes less reliable, but may still be usable. In some cases, newer, more recently added data storage drives may have lower faultiness levels than older, previously added data storage drives.

Previous data storage systems providing RAID protection have exhibited shortcomings in terms of providing appropriate levels of RAID protection for RAID groups containing data storage drives having varied levels of faultiness. For example, in some previous data storage systems, when a RAID group is configured, the specific level of RAID configured for the RAID group is selected without consideration of current levels of faultiness of the data storage drives in the RAID group. Some previous data storage systems would therefore allow a RAID group to be configured with a RAID level that provides too little data protection in view of the current faultiness levels of the data storage drives in the RAID group. For example, some previous data storage systems allow a RAID group that contains multiple data storage drives with high levels of faultiness to be configured with a RAID level that only prevents data loss in the case of single drive failures, but that does not prevent data loss when two or more data storage drives fail concurrently (e.g. 4D+1P RAID-5), thus allowing the risk of data loss to be unacceptably high.

Along the same lines, some previous data storage systems allow a RAID group to be configured with a RAID level that provides too much data protection in view of the current faultiness levels of the data storage drives in the RAID group. For example, some previous data storage systems allow a RAID group in which all data storage drives have low levels of faultiness to be configured with a RAID level that prevents data loss even in the case of multiple drive failures (e.g. 4D+2P RAID-6), thus wasting non-volatile data storage resources.

Previous data storage systems providing RAID protection have also exhibited shortcomings in terms of distributing data storage drives across multiple RAID groups without concentrating more faulty drives in certain ones of the RAID groups. As the number of data storage drives having high faultiness levels in any given RAID group increases, the probability that at any given time one or more of the data storage drives in that RAID group will fail also increases. Accordingly, also as the number of data storage drives with high faultiness levels in a RAID group increases, the probability that multiple data storage drives in that RAID group will concurrently fail also increases, thus increasing the probability of data loss with regard to data written into the corresponding logical RAID space. However, previous data storage systems have allowed faultier data storage drives to be unevenly distributed across multiple RAID groups of the data storage system. For example, an uneven distribution of faulty data storage drives across RAID groups may arise over time due to the use of relatively newer and less faulty data storage drives in specific RAID groups, and/or due to the usage level and/or performance degradation of specific individual data storage drives. When relatively faulty data storage drives are unevenly distributed across the RAID groups, they may be concentrated within some subset of the RAID groups, and the potential for data loss in that subset of the data storage system's RAID groups may be disproportionately higher than in the other RAID groups, thus decreasing the overall reliability of the data storage system.

In order to address the above described and other shortcomings of previous data storage systems, new technology is disclosed herein that provides RAID protection for data written into at least one logical RAID space, such that data written to the logical RAID space is stored in data storage drives contained in a corresponding RAID group of data storage drives. A faultiness level of each data storage drive in the RAID group is calculated based on drive health information collected for each one of the data storage drives in the RAID group, and a suitable RAID level for the RAID group is automatically generated based on the faultiness levels of the data storage drives contained in the RAID group.

In some embodiments, the suitable RAID level for the RAID group may be compared to a requested RAID level for the RAID group. In response to detecting that the suitable RAID level generated for the RAID group does not match the requested RAID level for the RAID group, a message may be generated indicating that the RAID level requested for the RAID group does not match the suitable RAID level for the RAID group.

In some embodiments, the suitable RAID level for the RAID group may be compared to a RAID level currently configured to the RAID group. In response to detecting that the suitable RAID level for the RAID group does not match the RAID level currently configured to the RAID group, a message may be generated indicating that the RAID level currently configured to the RAID group does not match the suitable RAID level for the RAID group.

In some embodiments, the RAID group may be automatically configured with the suitable RAID level for the RAID group, such that data subsequently written into the corresponding logical RAID space is stored in the RAID group according to the suitable RAID level for the RAID group.

In some embodiments, the at least one logical RAID space is one of multiple logical RAID spaces, and the RAID group is one of a plurality of RAID groups. Data written to each one of the logical RAID spaces is stored in data storage drives contained in a corresponding one of the multiple data storage drives. A faultiness level is calculated for each individual data storage drive in the plurality of RAID groups based on drive health information collected for each one of the data storage drives in the plurality of RAID groups. A faultiness-balanced distribution of the data storage drives across the RAID groups may be generated based on the faultiness levels of the individual data storage drives.

In some embodiments, the disclosed technology may determine whether the faultiness-balanced distribution of the data storage drives across the RAID groups matches a current distribution of the data storage drives across the RAID groups. In response to the faultiness-balanced distribution of the data storage drives across the RAID groups not matching the current distribution of the data storage drives across the RAID groups, the data storage drives may be automatically redistributed across the RAID groups according to the faultiness-balanced distribution of the data storage drives.

In some embodiments, automatically redistributing the data storage drives across the RAID groups of data storage drives according to the faultiness-balanced distribution of the data storage drives may include moving at least one of data storage drive from a first one of the RAID groups to a second one of the RAID groups.

In some embodiments, generating the faultiness-balanced distribution of the faulty data storage drives across the RAID groups may include determining a faultiness-balanced distribution of the data storage drives across the RAID groups that minimizes a range of values of a faultiness metric calculated for the individual RAID groups based on the faultiness levels of the individual data storage drives. The faultiness metric calculated for each RAID group may, for example, be a size of the RAID group divided by a sum of the faultiness levels of the data storage drives contained in the RAID group.

In some embodiments, the disclosed technology may determine whether the faultiness-balanced distribution of the data storage drives across the RAID groups provides a significant improvement over a current distribution of the data storage drives across the RAID groups. In response to the faultiness-balanced distribution of the data storage drives across the RAID groups providing a significant improvement over the current distribution of the data storage drives across the RAID groups, the data storage drives may be automatically redistributed across the RAID groups according to the faultiness-balanced distribution of the data storage drives.

Embodiments of the disclosed technology may provide significant improvements over previous data storage technology. For example, the disclosed technology may avoid configuration of a RAID group with a RAID level that provides too little data protection in view of the current faultiness levels of the data storage drives in that RAID group, thus preventing a high risk of data loss from occurring. The disclosed technology may also avoid configuration of a RAID group with a RAID level that provides too much data protection in view of the current faultiness levels of the data storage drives in the RAID group, thus preventing non-volatile data storage resources from being wasted. In another example, by generating a faultiness-balanced distribution of data storage drives across multiple RAID groups, the disclosed technology enables drive faultiness to be evenly distributed across the RAID groups. In this way, the disclosed technology may avoid uneven concentration of data storage drive faultiness into certain RAID groups, thus reducing the likelihood of concurrent data storage drive failure within individual RAID groups. The disclosed technology may therefore improve the overall reliability of the data storage system by lessening the risk of data loss due to concurrent data storage drive failures occurring within an individual RAID group of data storage drives.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 4 is a flow chart showing an example of steps that may be performed during operation of some embodiments.

DETAILED DESCRIPTION

Embodiments of the invention will now be described with reference to the figures. The embodiments described herein are provided only as examples, in order to illustrate various features and principles of the disclosed technology, and the invention is broader than the specific embodiments described herein.

The technology disclosed herein may improve over previous technologies by providing drive health aware operation with regard to RAID level configuration and distribution of data storage drives across RAID groups. The disclosed technology provides RAID protection for data written into one or multiple logical RAID spaces. Data written to each one of the RAID spaces is stored in data storage drives contained in a corresponding RAID group of data storage drives, e.g. a corresponding one of multiple RAID groups of data storage drives. The disclosed technology collects drive health information for each individual data storage drive contained in the RAID groups, and calculates a faultiness level of each individual data storage drive based on the drive health information. The disclosed technology may automatically generate a suitable RAID level for at least one of the RAID groups based on the faultiness levels of the data storage drives contained in the RAID group. The RAID group may then advantageously be configured (e.g. automatically configured) with the suitable RAID level that was automatically generated for the RAID group, such that data subsequently written into the corresponding logical RAID space is stored in the RAID group according to the suitable RAID level. The disclosed technology may also generate a faultiness-balanced distribution of the data storage drives across the RAID groups based on the calculated faultiness levels of the individual data storage drives. In response to detecting that the faultiness-balanced distribution of the data storage drives across the RAID groups does not match a current distribution of the data storage drives across the RAID groups, and/or in response to detecting that the faultiness distribution of the data storage drives across the RAID groups provides a significant improvement over the current distribution of the data storage drives across the RAID groups, the disclosed technology may automatically redistribute the data storage drives across the RAID groups according to the faultiness-balanced distribution of the data storage drives that was generated.

Figure 1:
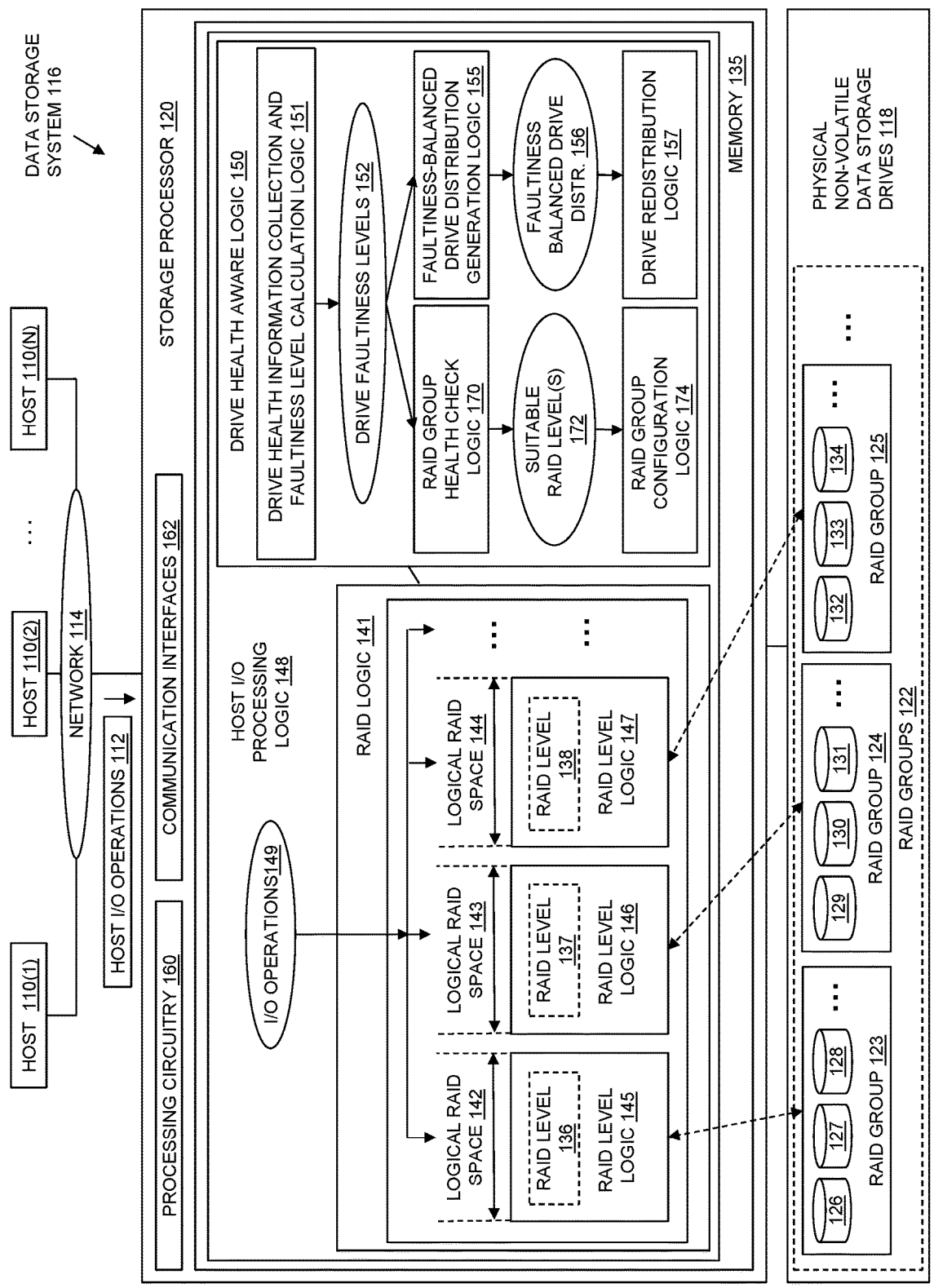
FIG. 1 is a block diagram showing an example of a data storage system in which an example of the disclosed technology is embodied.

FIG. 1 is a block diagram showing an operational environment for the disclosed technology, including an example of a data storage system in which the disclosed technology may be embodied. FIG. 1 shows some number of physical and/or virtual Host Computing Devices 110, referred to as "hosts" and shown for purposes of illustration by Hosts 110(1) through 110(N). The hosts access non-volatile data storage provided by Data Storage System 116, for example over one or more networks, such as a local area network (LAN), and/or a wide area network (WAN) such as the Internet, etc., and shown for purposes of illustration in FIG. 1 by Network 114, which may be communicable coupled to Storage Processor 120 through Communication Interfaces 162. Data Storage System 116 may include at least one Storage Processor 120, and Physical Non-Volatile Data Storage Drives 118. No particular hardware configuration is required, and Storage Processor 120 may be embodied as any specific type of device that is capable of processing host input/output (I/O) operations received from Hosts 110 (e.g. I/O read and I/O write operations, etc.).

The Physical Non-Volatile Data Storage Drives 118 of the Data Storage System 116 may include some number of physical data storage drives such as solid state drives, magnetic disk drives, hybrid drives, optical drives, and/or other specific types of drives. Physical Non-Volatile Data Storage Drives 118 may be directly physically connected to and/or contained within Storage Processor 120, and/or may be communicably connected to Storage Processor 120 by way of one or more computer networks.

A Memory 135 in Storage Processor 120 stores program code that is executable on Processing Circuitry 160. Memory 135 may include volatile memory (e.g. RAM), and/or other types of memory. The Processing Circuitry 160 may, for example, include or consist of one or more microprocessors, e.g. central processing units (CPUs), multi-core processors, chips, and/or assemblies, and associated circuitry. Processing Circuitry 160 and Memory 135 together form control circuitry, which is configured and arranged to carry out various methods and functions as described herein. The Memory 135 stores a variety of software components that may be provided in the form of executable program code. For example, Memory 135 may include software components such as Host I/O Processing Logic 148. When program code in Memory 135 is executed by Processing Circuitry 160, Processing Circuitry 160 is caused to carry out the operations of the software components. Although certain software components are shown and described for purposes of illustration and explanation, those skilled in the art will recognize that Memory 135 may include various other software components, such as an operating system, various applications, other processes, etc.

Physical Non-Volatile Data Storage Drives 118 are divided into some number of RAID groups, and each RAID group may contain any specific number of data storage drives. The assignments of specific data storage drives to specific RAID groups may be stored in one or more data structures or the like that are maintained by and within RAID Logic 141. For purposes of illustration, RAID Groups 122 is shown including at least RAID Group 123, RAID Group 124, and RAID Group 125. Further for purposes of illustration, RAID Group 123 is shown containing at least data storage drives 126, 127, and 128, RAID Group 124 is shown containing at least data storage drives 129, 130, and 131, and RAID Group 125 is shown containing at least data storage drives 132, 133, and 134. To ensure proper RAID operation, an individual data storage drive may be contained only within a single RAID group.

While processing Host I/O Operations 112, Host I/O Processing Logic 148 generates I/O Operations 149 that are performed by Storage Processor 120 to store data indicated by Host I/O Operations 112 onto Physical Non-Volatile Data Storage Drives 118 with RAID protection. During processing of I/O Operations 149, RAID Logic 141 maps the I/O operations in I/O Operations 149 onto multiple logical RAID spaces, shown for purposes of illustration as including Logical RAID Space 142, Logical RAID Space 143, and Logical RAID Space 144.

RAID level logic for each logical RAID space independently provides a configurable level of RAID protection with regard to data written by those write I/O operations in I/O Operations 149 that are directed to that logical RAID space. For example, RAID Level Logic 145 provides a level of RAID protection that is indicated by RAID Level 136 for data written by write I/O operations that are directed to Logical RAID Space 142, RAID Level Logic 146 provides a level of RAID protection that is indicated by RAID Level 137 for data written by write I/O operations that are directed to Logical RAID Space 143, and RAID Level Logic 147 provides a level of RAID protection that is indicated by RAID Level 138 for data written by write I/O operations that are directed to Logical RAID Space 144. The specific level of RAID protection provided by the RAID level logic for any specific logical RAID space is configurable, and accordingly may be initially set and/or dynamically changed by Host I/O Processing Logic 148. Accordingly, the level of RAID protection provided by RAID Level Logic 145 for data written by write I/O operations that are directed to Logical RAID Space 142 may be configured by Host I/O Processing Logic 148 setting or changing RAID Level 136, the level of RAID protection provided by RAID Level Logic 146 for data written by write I/O operations that are directed to Logical RAID Space 143 may be configured by Host I/O Processing Logic 148 setting or changing RAID Level 137, and the level of RAID protection provided by RAID Level Logic 147 for data written by write I/O operations that are directed to Logical RAID Space 144 may be configured by Host I/O Processing Logic 148 setting or changing RAID Level 138.

Each individual logical RAID space corresponds to one and only one of the RAID groups in RAID Groups 122. For each logical RAID space, RAID Logic 141 stores an indication (e.g. in one or more data structures) of the corresponding RAID group. For example, Logical RAID Space 142 corresponds to RAID Group 123, Logical RAID Space 143 corresponds to RAID Group 124, and Logical RAID Space 144 corresponds to RAID Group 126.

Each RAID group contains a number data storage drives that corresponds to the RAID level provided by the RAID level logic for the corresponding logical RAID space. For example, a RAID group corresponding to a logical RAID space with RAID level logic configured to provide 4D+1P RAID-5 protection may contain five data storage drives in order to store the four blocks of data and one block of parity information contained in each stripe defined by 4D+1P RAID-5 across different data storage drives. In another example, a RAID group corresponding to a logical RAID space with RAID level logic configured to provide 4D+2P RAID-6 protection may contain six data storage drives in order to store the four blocks of data and two blocks of parity information contained in each stripe defined by 4D+2P RAID-6 across different data storage drives. In another example, a RAID group corresponding to a logical RAID space with RAID level logic configured to provide RAID-1 mirroring may contain at least two data storage drives in order to support mirroring of the data on two or more data storage drives.

Each I/O operation in I/O Operations 149 indicates a logical address contained within a specific one of the logical RAID spaces, e.g. a logical address within Logical RAID Space 142, Logical RAID Space 143, or Logical RAID Space 144. RAID Logic 141 maps the logical address of each I/O operation to the specific logical RAID space in which it is contained, and then to physical locations within the data storage drives in the RAID group corresponding to that logical RAID space. The RAID level logic for that logical address space can then securely store the data indicated by the I/O operation (e.g. host data indicated by a host write I/O operation) onto the data storage drives in the RAID group corresponding to the logical RAID space. For example, data written to Logical RAID Space 142 is stored by RAID Level Logic 145 according to RAID Level 136 into the data storage drives contained in RAID Group 123, data written to Logical RAID Space 143 is stored by RAID Level Logic 146 according to RAID Level 137 into the data storage drives contained in RAID Group 124, and data written to Logical RAID Space 144 is stored by RAID Level Logic 147 according to RAID Level 138 into the data storage drives contained in RAID Group 125.

For example, for a write operation in I/O Operations 149, RAID Logic 141 may determine that a logical address indicated by the operation is contained within Logical RAID Space 142. RAID Logic 141 maps the logical address of the I/O operation to logical RAID Space 142, and then RAID Level Logic 145 stores the data indicated by the I/O operation to physical locations in the data storage drives contained within RAID Group 123 according to RAID Level 136, causing the data indicated by the I/O operation indicating Logical RAID Space 142 to be securely stored in data storage drives that are contained in RAID Group 123.

Further during operation of the components shown in FIG. 1, Drive Health Aware Logic 150 may perform drive health aware operations to automatically generate a RAID level for one or more of the RAID groups in RAID Groups 122, and/or to automatically generate a distribution of the data storage drives in Physical Non-Volatile Data Storage Drives 118 across the RAID groups 122, based on health information collected from individual data storage drives. For example, as shown in FIG. 1, Drive Health Information Collection and Faultiness Level Calculation Logic 151 may collect drive health information from each individual data storage drive in Physical Non-Volatile Data Storage Drives 118. The drive health information collected by Drive Health Information Collection and Faultiness Level Calculation Logic 151 from each data storage drive may include current values for some number of drive health parameters. Such drive health parameters may, for example, include or consist of drive health parameters such as total number of read operation errors on the drive, total number of seek operation errors on the drive, total number of relocated sectors on the drive, amount of throughput performance decrease in the drive since a previous point in time, total number of program/erase operation failures on the drive, and/or other types of drive health parameters that may be collected for each individual data storage drive.

Drive Health Information Collection and Faultiness Level Calculation Logic 151 then calculates a faultiness level of each data storage drive in RAID Groups 122 based on the drive health information collected for that drive. For example, each drive health parameter collected for a drive may be compared to a corresponding threshold value. When the current value of a drive health parameter for a drive exceeds the threshold for that parameter, the faultiness level for the drive may be incremented. As a result, the faultiness level for each drive may be equal to a total number of collected drive health parameters for the drive that have current values that exceed their corresponding thresholds. Alternatively, a weighted score may be calculated for each drive, such that the per-drive faultiness level is incremented by different increments depending on the specific drive health parameter for which the corresponding threshold is exceeded. In another alternative, each drive is determined to be either i) reliable or ii) less reliable, based on the current values of the collected drive health parameters for the drive, and then assigned faultiness level, e.g. a faultiness level of 0 for reliable or 1 for less reliable. In another alternative, the faultiness level for each drive may be calculated as a value within a predetermined faultiness range, e.g. between 0 and 10, with 10 representing the highest degree of faultiness. The per-drive faultiness levels calculated by Drive Health Information Collection and Faultiness Level Calculation Logic 151 are shown in FIG. 1 by Drive Faultiness Levels 152. In some embodiments, each data storage drive having a faultiness level that exceeds a pre-determined per-drive faultiness level threshold may be considered to be a faulty drive.

Those skilled in the art will recognize that calculation of a relatively higher faultiness level for a data storage drive, and/or a faultiness level that exceeds the per-drive faultiness level threshold, does not necessarily indicate that the drive must be replaced immediately. Instead, a relatively higher faultiness level calculated for a data storage drive may provide an indication that the probability of that drive experiencing a fault may be higher than that of a drive with a relatively lower calculated faultiness level.

In some embodiments, RAID Group Health Check Logic 170 automatically generates a suitable RAID level for one or more RAID group in RAID Groups 122 based on the faultiness levels of the data storage drives contained in the RAID group found in Drive Faultiness Levels 152. For example, a suitable RAID level for a RAID group may be generated by RAID Group Health Check Logic 170 based on the specific number of faulty data storage drives in the RAID group, such that levels of RAID protection operable to provide higher levels of data protection (e.g. RAID levels operable to protect against higher numbers of concurrent data storage drive failures) are generated for RAID groups containing higher numbers of faulty data storage drives. For example, in the case where the data storage drives in a RAID group include no faulty data storage drives, then the suitable RAID level automatically generated for that RAID group may be a RAID level providing protection against data loss in the case of single data storage drive failures, such as 4D+1P RAID-5. In another example, in the case where the data storage drives in a RAID group include one faulty data storage drive, then the suitable RAID level automatically generated for that RAID group may be a RAID level providing protection against data loss for up to a maximum of two concurrently failing data storage drives, such as 4D+2P RAID-6. And in another example, in the case where the data storage drives in a RAID group include more than one faulty data storage drive, then the suitable RAID level automatically generated for that RAID group may be a RAID level that performs data mirroring across the data storage drives in the RAID group, such as RAID-1 or RAID-10.

The RAID Group Health Check Logic 170 may also automatically generate a suitable number of data storage drives for configuration of one or more of the RAID groups. For example, in the case where the automatically generated suitable RAID level for a RAID group is 4D+1P RAID-5, then the suitable number of data storage drives generated for that RAID group is at least five. In another example, in the case where the automatically generated suitable RAID level for a RAID group is 4D+2P RAID-6, then the suitable number of data storage drives generated for that RAID group is at least six. And in another example, in the case where the automatically generated suitable RAID level for a RAID group is a RAID level that performs mirroring, in response to detecting that the RAID group contains more than one faulty data storage drive, the suitable number of data storage drives generated for that RAID group is a number of data storage drives that is larger than the total number of faulty data storage drives in the RAID group.

The suitable RAID levels and/or required numbers of data storage drives generated by RAID Group Health Check Logic 170 are shown for purposes of illustration in FIG. 1 by Suitable RAID Level(s) 172, and are passed from RAID Group Health Check Logic 170 to RAID Group Configuration Logic 174.

In some embodiments, for one or more of the RAID groups, RAID Group Configuration Logic 174 may compare the suitable RAID level generated for the RAID group to a requested RAID level for the RAID group. The requested RAID level for the RAID group may, for example, be a RAID level that was requested (e.g. manually entered) for the RAID group during configuration and/or creation of the RAID group by a user. In response to detecting that the suitable RAID level generated for the RAID group does not match the requested RAID level for the RAID group, RAID Group Configuration Logic 174 may generate a message indicating that the RAID level requested for the RAID group does not match the suitable RAID level for the RAID group. For example, such a message may consist of or include a warning message displayed in a graphical user interface of the data storage system or a host computer, and/or a message stored in an event log or the like stored in the data storage system or a host computer indicating that the requested RAID level does not match the suitable RAID level for the RAID group, and identifying the suitable RAID level for the RAID group to the user.

In some embodiments, for one or more of the RAID groups, RAID Group Configuration Logic 174 may compare the suitable RAID level generated for the RAID group to a RAID level currently configured to the RAID group. The RAID level currently configured to the RAID group may, for example, be a RAID level currently being used to store data written to the logical RAID space corresponding to the RAID group into the data storage drives contained in the RAID group. For example, the automatically generated suitable RAID level for RAID Group 123 may be compared to RAID Level 136 that is currently being used to store data written to Logical RAID Space 142 into the data storage drives contained in the RAID Group 123. In response to detecting that the suitable RAID level generated for the RAID group does not match the RAID level currently configured to the RAID group, RAID Group Configuration Logic 174 may generate a message indicating that the RAID level currently configured to the RAID group does not match the suitable RAID level for the RAID group. For example, such a message may consist of or include a warning message displayed in a graphical user interface of the data storage system or a host computer, and/or a message stored in an event log or the like within the data storage system or a host computer, indicating that the RAID level currently configured to the RAID group does not match the suitable RAID level for the RAID group, and identifying the suitable RAID level for the RAID group to the user.

In some embodiments, for one or more of the RAID groups, the RAID group may be automatically configured with the suitable RAID level for the RAID group, such that data subsequently written into the corresponding logical RAID space is stored in the RAID group according to the suitable RAID level for the RAID group. For example, RAID Group Configuration Logic 174 may automatically configure RAID Group 123 with the suitable RAID level for RAID Group 123 by initially setting or dynamically changing the RAID Level 136 to the suitable RAID level automatically generated for RAID Group 123.

In some embodiments, RAID Group Configuration Logic 174 may prevent a RAID group from being manually configured with a RAID level that does not match the suitable RAID level for that RAID group.

In some embodiments, RAID Group Configuration Logic 174 may estimate the probabilities of recoverable and non-recoverable faults for RAID level requested for a RAID group, or for a RAID level currently configured to a specific RAID group, and compare one or more of such probabilities with a corresponding threshold. RAID Configuration Logic 174 may then generate a message or log entry indicating an excessive probability of faults occurring in the event that the corresponding threshold is exceeded.

Drive Health Aware Logic 150 may generate a faultiness-balanced distribution of the data storage drives across the RAID Groups 122 based on the Drive Faultiness Levels 152. For example, in some embodiments, Drive Health Information Collection and Faultiness Level Calculation Logic 151 may pass Drive Faultiness Levels 152 to Faultiness-Balanced Drive Distribution Generation Logic 155. For each one of multiple distributions of the data storage drives in Physical Non-Volatile Data Storage Drives 118 across the RAID Groups 122, Faultiness-Balanced Drive Distribution Generation Logic 155 may, based on the per-drive faultiness levels in Drive Faultiness Levels 152, calculate a value of a per-RAID group faultiness metric for each one of the RAID groups in RAID Groups 122. The values calculated for the per-RAID group faultiness metric provide a faultiness level for each RAID group in a given distribution of the data storage drives across the RAID groups. The range of the per-RAID group faultiness metric values calculated for a given distribution of the data storage drives represents how unevenly distributed the faultiness of the data storage drives is distributed across the RAID groups. Accordingly, a data storage drive distribution resulting in a relatively larger range of calculated per-RAID group faultiness metric values has a more uneven distribution of individual drive faultiness across the RAID groups, while a data storage drive distribution resulting in a relatively smaller range of calculated per-RAID group faultiness metric values indicates a more even distribution of individual drive faultiness across the RAID groups. In some embodiments, Faultiness-Balanced Drive Distribution Generation Logic 155 may calculate faultiness metric values for a current distribution of the data storage drives across the RAID Groups 122, and for one or more other candidate distributions of the data storage drives across the RAID Groups 122. Faultiness-Balanced Drive Distribution Generation Logic 155 may then select as a faultiness-balanced distribution of the data storage drives (e.g. as Faultiness-Balanced Drive Distribution 156) the distribution of the data storage drives across the RAID Groups 122 for which the calculated per-RAID group faultiness metric values have the smallest range, and through which accordingly the individual drive faultiness levels are most evenly distributed.

In some embodiments, for a given data storage drive distribution, the value of the per-RAID group faultiness metric may be calculated for each RAID group as a total size of the RAID group divided by a sum of the faultiness levels of the data storage drives contained in the RAID group. Accordingly, for each RAID group the value of the per-RAID group faultiness metric may be calculated as:

RAID_Group_Size/Sum(Drive_Faultiness)

where:
RAID_Group_Size is either a i) total capacity of the RAID group (e.g. a total of the combined capacities of the data storage drives contained in the RAID group), or ii) a total amount of data currently stored in the RAID group, and
Sum(Drive_Faultiness) is a sum of the faultiness levels of the data storage drives contained in the RAID group.

For example, in some embodiments, Faultiness-Balanced Drive Distribution Generation Logic 155 may be configured to generate Faultiness Balanced Drive Distribution 156 based on the Drive Faultiness Levels 152 and the sizes of the individual RAID groups using logic that, at least in part, solves a variation of the n-bin partition problem, such that the RAID groups are considered bins of different sizes (e.g. where size is total capacity or amount of stored data per RAID group), and in which the individual data storage drives are considered goods with weights equal to their individual faultiness levels, and in which the specific metric to be minimized is the above described per-RAID group faultiness metric. In such embodiments, Faultiness-Balanced Drive Distribution Generation Logic 155 may, for example, be configured at least in part to use a heuristic to generate Faultiness Balanced Drive Distribution 156. Possible heuristics that may be used in such configurations include the greedy algorithm, and the largest differencing method.

Faultiness-Balanced Drive Distribution 156 may be passed to Drive Redistribution Logic 157. Drive Redistribution Logic 157 may then compare Faultiness-Balanced Drive Distribution 156 to a current distribution of the data storage drives across the RAID Groups 122. Drive Redistribution Logic 157 may then determine whether Faultiness-Balanced Drive Distribution 156 matches a current distribution of the data storage drives across the RAID Groups 122. In response to determining that Faultiness-Balanced Drive Distribution 156 does not match the current distribution of the data storage drives across the RAID Groups 122, Drive Redistribution Logic 157 may automatically redistribute the data storage drives across the RAID Groups 122 according to the Faultiness-Balanced Drive Distribution 156. Automatically redistributing the data storage drives across the RAID Groups 122 according to Faultiness-Balanced Drive Distribution 156 may be accomplished by modifying one or more data structures in RAID Logic 141 to indicate that the data storage drives in Physical Non-Volatile Data Storage Drives 118 are distributed across RAID Groups 122 according to the Faultiness-Balanced Drive Distribution 156. Automatically redistributing the data storage drives across the RAID Groups 122 according to Faultiness-Balanced Drive Distribution 156 may further include moving or re-assigning data storage drives between individual RAID groups in the RAID Groups 122 according to Faultiness-Balanced Drive Distribution 156. Automatically redistributing the data storage drives across the RAID Groups 122 according to Faultiness-Balanced Drive Distribution 156 may also include moving previously stored data as necessary among the data storage drives so that the previously stored data is located on the data storage drives located in the correct RAID groups according to Faultiness-Balanced Drive Distribution 156.

In some embodiments, prior to redistributing the data storage drives across the RAID Groups 122 according to Faultiness-Balanced Drive Distribution 156, Drive Redistribution Logic 157 may determine whether the Faultiness-Balanced Drive Distribution 156 provides a significant improvement over a current distribution of the data storage drives across the RAID Groups 122, and only redistribute the data storage drives across the RAID Groups 122 according to Faultiness-Balanced Drive Distribution 156 in the case where Faultiness-Balanced Drive Distribution 156 provides a significant improvement over the current distribution of the data storage drives across the RAID Groups 122. For example, Drive Redistribution Logic 157 may determine whether the Faultiness-Balanced Drive Distribution 156 provides a significant improvement over a current distribution of the data storage drives across the RAID Groups 122 by comparing i) a size of the range of the values of the per-RAID group faultiness metric calculated when the current distribution of data storage drives is used, to ii) a size of the range of the values of the per-RAID group faultiness metric calculated when the Faultiness-Balanced Drive Distribution 156 is used. Drive Redistribution Logic 157 may then determine that Faultiness-Balanced Drive Distribution 156 provides a significant improvement over the current distribution of the data storage drives in the case where a difference between i) the range of the values of the per-RAID group faultiness metric calculated when the current distribution of data storage drives is used, and ii) the range of the values of the per-RAID group faultiness metric calculated when the Faultiness-Balanced Drive Distribution 156 is used exceeds a predetermined minimum threshold.

In some embodiments, Drive Health Information Collection and Faultiness Level Calculation Logic 151 may periodically collect new drive health information from the data storage drives and recalculate Drive Faultiness Levels 152. Faultiness-Balanced Drive Distribution Generation Logic 155 may then regenerate Faultiness-Balanced Drive Distribution 156, and Drive Redistribution Logic 157 may automatically redistribute the data storage drives across RAID Groups 122 if the Faultiness-Balanced Drive Distribution 156 provides a significant improvement over the current data storage drive distribution.

Figure 2:
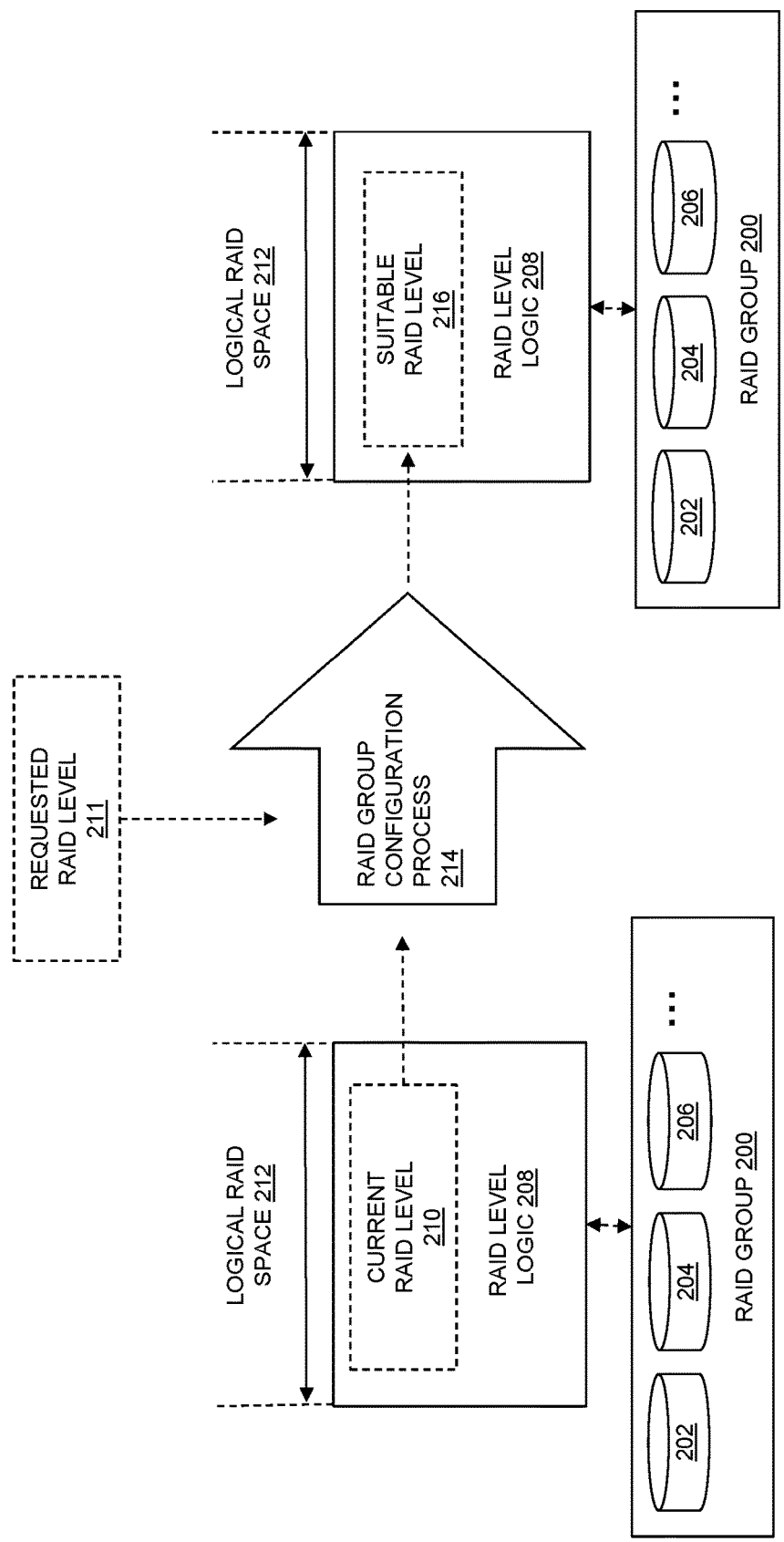
FIG. 2 is a block diagram showing an example of RAID level configuration in response to a RAID level generated based on the collected faultiness levels of data storage drives in a RAID group.

FIG. 2 is a block diagram showing an example of a process of RAID level configuration of a RAID group in response to a RAID level generated based on the collected faultiness levels of the data storage drives in a RAID group. As shown in FIG. 2, RAID Group 200 includes some number of data storage drives, including data storage drives 202, 204, and 206. RAID Group 200 corresponds to Logical RAID Space 212. Accordingly, data written by write I/O operations directed to logical addresses within Logical RAID Space 212 is stored into the data storage drives in RAID Group 200 by RAID Level Logic 208. As disclosed herein, a suitable RAID level may be automatically generated for RAID Group 200 based on collected faultiness levels of the data storage drives contained in RAID Group 200, shown for purposes of illustration in FIG. 2 by Suitable RAID Level 216.

In one example of operation of RAID Group Configuration Process 214, during which RAID Group 200 is being configured by a user, a RAID level may be requested by the user for RAID Group 200, e.g. Requested RAID Level 211. Requested RAID Level 211 may be compared to Suitable RAID Group 216. In response to detecting that Requested RAID Level 211 does not match Suitable RAID Level 216 for RAID Group 200, RAID Group Configuration Process 214 may perform one or more actions. For example, in response to detecting that Requested RAID Level 211 does not match Suitable RAID Level 216 for RAID Group 200, RAID Group Configuration Process 214 may generate a message to the user (e.g. a visually displayed warning message, log entry, etc.) indicating that Requested RAID Level 211 does not match Suitable RAID Level 216. In another example, in response to detecting that the Requested RAID Level 211 does not match Suitable RAID Level 216, RAID Group Configuration Process 214 may prevent configuration of RAID Group 200 with Requested RAID Level 211. And in another example, in response to detecting that Requested RAID Level 211 does not match Suitable RAID Level 216, RAID Group Configuration Process 214 may automatically configure RAID Group 200 with Suitable RAID Level 216, such that subsequent to RAID Group Configuration Process 214 being performed, data written to Logical RAID Space 212 is stored by RAID Level Logic 208 into the data storage drives contained in RAID Group 200 according to Suitable RAID Level 216.

In another example of operation of RAID Group Configuration Process 214, during which RAID Group 200 is being dynamically automatically configured, a RAID level previously configured to RAID Group 200 (e.g. Current RAID Level 210) may currently be in use by RAID Level Logic 208, such that data written to Logical RAID Space 212 is currently being stored into the data storage drives contained in RAID Group 200 according to Current RAID Level 210. Current RAID Level 210 may be compared to Suitable RAID Group 216. In response to detecting that Current RAID Level 210 does not match Suitable RAID Level 216 for RAID Group 200, RAID Group Configuration Process 214 may generate a message to a user (e.g. a visually displayed warning message, log entry, etc.) indicating that Current RAID Level 210 does not match Suitable RAID Level 216. In another example, in response to detecting that Current RAID Level 210 does not match Suitable RAID Level 216, RAID Group Configuration Process 214 may automatically configure RAID Group 200 with Suitable RAID Level 216, such that subsequent to RAID Group Configuration Process 214 being dynamically performed, data written to Logical RAID Space 212 is stored by RAID Level Logic 208 into the data storage drives contained in RAID Group 200 according to Suitable RAID Level 216.

Figure 3:
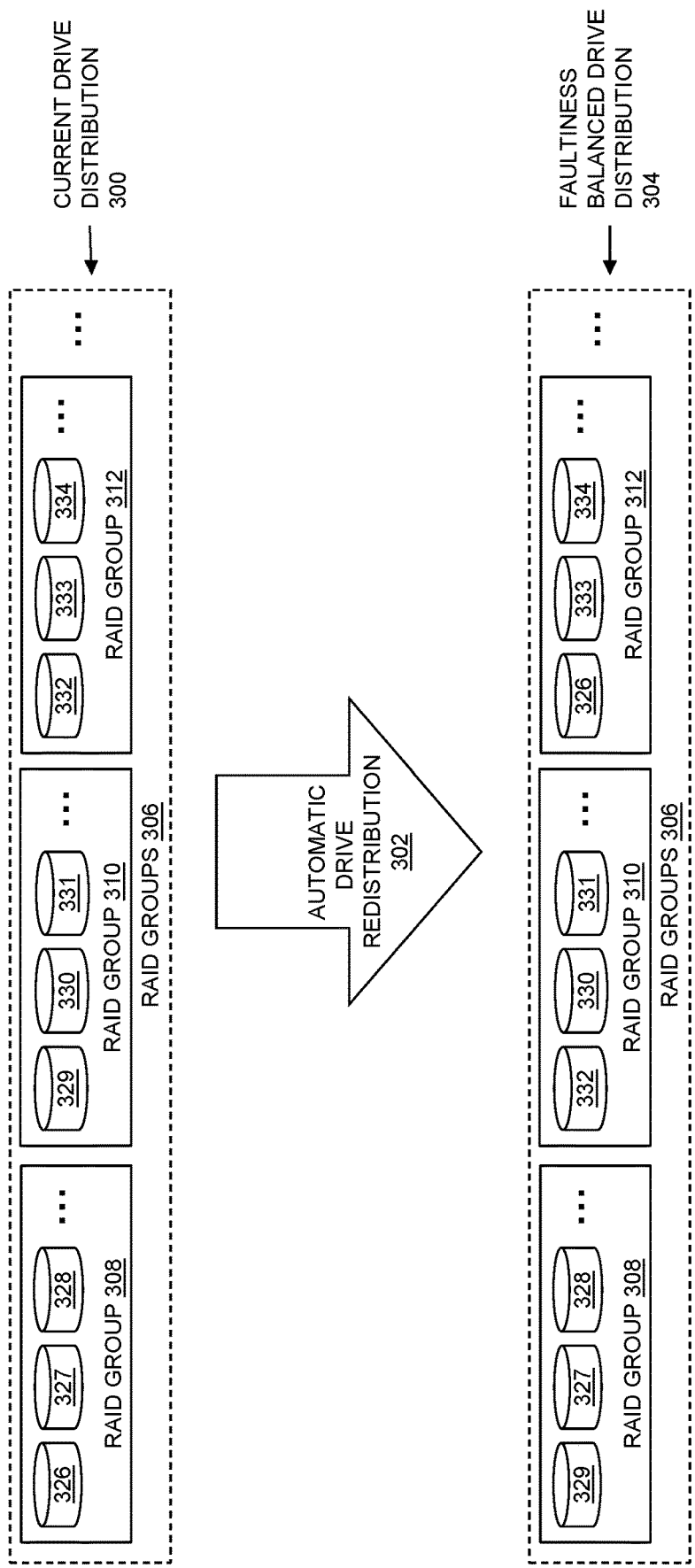
FIG. 3 is a block diagram showing an example of automatic drive redistribution from a current drive distribution to a faultiness-balanced drive distribution in some embodiments.

FIG. 3 is a block diagram showing an example of Automatic Drive Redistribution 302 from a Current Drive Distribution 300 to a Faultiness-Balanced Drive Distribution 304. As shown in FIG. 3, redistribution of the data storage drives according to Faultiness-Balanced Drive Distribution 304 may include or consist of moving at least one of data storage drive from a first one of the RAID groups to a second one of the RAID groups.

In the example of FIG. 3, distribution of the data storage drives in the data storage system across the RAID Groups 306 according to Current Drive Distribution 300 results in RAID Group 308 containing at least data storage drives 326, 327, and 328, RAID Group 310 containing at least data storage drives 329, 330, and 331, and RAID Group 312 containing at least data storage drives 332, 333, and 334. The disclosed technology may determine a Faultiness-Balanced Drive Distribution 304, and also determine that Faultiness-Balanced Drive Distribution 304 is different from Current Drive Distribution 300, and/or that Faultiness-Balanced Drive Distribution 304 provides a significant improvement over Current Drive Distribution 300. In response to determining that Faultiness-Balanced Drive Distribution 304 is different from Current Drive Distribution 300, and/or that Faultiness-Balanced Drive Distribution 304 provides a significant improvement over Current Drive Distribution 300, the disclosed technology may perform Automatic Drive Redistribution 302 that redistributes the data storage drives of the data storage system according to Faultiness Balanced Drive Distribution 304. As a result of performing Automatic Drive Redistribution 302, the distribution of the data storage drives in the data storage system across the RAID Groups 306 is changed such that the data storage drives in the data storage system are distributed across RAID Groups 306 according to Faultiness Balanced Drive Distribution 304, such that RAID Group 308 contains at least data storage drives 329, 327, and 328, RAID Group 310 contains at least data storage drives 332, 330, and 331, and RAID Group 312 contains at least data storage drives 326, 333, and 334. During Automatic Drive Redistribution 302, data storage drive 326 was moved from RAID Group 308 to RAID Group 312, data storage drive 332 was moved from RAID Group 312 to RAID Group 310, and data storage drive 329 was moved from RAID Group 310 to RAID Group 308. In some embodiments, moving a data storage drive from one RAID group to another RAID group during an automatic drive redistribution may, for example, include or consist of swapping spare drives between the RAID groups if both RAID groups include at least one spare drive.

FIG. 4 is a flow chart showing an example of steps that may be performed during operation of some embodiments.

At step 400, RAID (Redundant Array of Independent Disks) protection is provide for data written into one or more (e.g. multiple) logical RAID spaces, with data written to each one of the RAID spaces stored in data storage drives contained in a corresponding one of multiple RAID groups of data storage drives.

At step 402, drive health information is collected for each individual data storage drive contained in the RAID groups.

At step 403, faultiness levels are calculated for the individual data storage drives contained in the RAID groups based on the collected drive health information.

At step 404, for at least one of the RAID groups, a suitable RAID level is automatically generated for the RAID group based on the faultiness levels calculated for the individual data storage drives contained in the RAID group based on the collected health information.

At step 406, at least one of the RAID groups is configured with the suitable RAID level that was automatically generated for that RAID group.

At step 408, a faultiness-balanced distribution of the data storage drives across the RAID groups may be generated based on the calculated faultiness levels for the individual data storage drives.

At step 410, in response to the faultiness-balanced distribution of the data storage drives across the RAID groups not matching a current distribution of the data storage drives across the RAID groups, and/or in response to the faultiness distribution of the data storage drives across the RAID groups providing a significant improvement over the current distribution of the data storage drives across the RAID groups, the data storage drives may be automatically redistributed across the RAID groups according to the faultiness-balanced distribution of the data storage drives.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
providing RAID (Redundant Array of Independent Disks) protection for data written into a logical RAID space, wherein data written to the logical RAID space is stored in data storage drives contained in a corresponding RAID group of data storage drives, wherein the logical RAID space is one of a plurality of logical RAID spaces and the RAID group is one of a plurality of RAID groups, wherein data written to each one of the logical RAID spaces is stored in data storage drives contained in a corresponding one of the plurality of data storage drives;
calculating a faultiness level of each individual data storage drive in the plurality of RAID groups based on drive health information collected for each one of the data storage drives in the plurality of RAID groups;
generating a suitable RAID level for the RAID group based on the faultiness levels of the data storage drives contained in the RAID group; and
generating a faultiness-balanced distribution of the data storage drives across the RAID groups based on the faultiness levels of the individual data storage drives, wherein generating the faultiness-balanced distribution of the faulty data storage drives across the RAID groups further comprises:
  determining a faultiness-balanced distribution of the data storage drives across the RAID groups that minimizes a range of values of a faultiness metric calculated for the individual RAID groups based on the faultiness levels of the individual data storage drives, and
  wherein the faultiness metric calculated for each RAID group comprises a size of the RAID group divided by a sum of the faultiness levels of the data storage drives contained in the RAID group.

2. The method of claim 1, further comprising:
comparing the suitable RAID level for the RAID group to a requested RAID level for the RAID group; and
in response to detecting that the suitable RAID level for the RAID group does not match the requested RAID level for the RAID group, generating a message indicating that the RAID level requested for the RAID group does not match the suitable RAID level for the RAID group.

3. The method of claim 1, further comprising:
comparing the suitable RAID level for the RAID group to a RAID level currently configured to the RAID group; and
in response to detecting that the suitable RAID level for the RAID group does not match the RAID level currently configured to the RAID group, generating a message indicating that the RAID level currently configured to the RAID group does not match the suitable RAID level for the RAID group.

4. The method of claim 1, further comprises:
automatically configuring the RAID group with the suitable RAID level for the RAID group, such that data subsequently written into the corresponding logical RAID space is stored in the RAID group according to the suitable RAID level for the RAID group.

5. The method of claim 1, further comprising:
determining whether the faultiness-balanced distribution of the data storage drives across the RAID groups matches a current distribution of the data storage drives across the RAID groups; and
in response to the faultiness-balanced distribution of the data storage drives across the RAID groups not matching the current distribution of the data storage drives across the RAID groups, automatically redistributing the data storage drives across the RAID groups according to the faultiness-balanced distribution of the data storage drives.

6. The method of claim 5, wherein automatically redistributing the data storage drives across the RAID groups of data storage drives according to the faultiness-balanced distribution of the data storage drives includes moving at least one of data storage drive from a first one of the RAID groups to a second one of the RAID groups.

7. The method of claim 1, further comprising:
determining whether the faultiness-balanced distribution of the data storage drives across the RAID groups provides a significant improvement over a current distribution of the data storage drives across the RAID groups; and
in response to the faultiness-balanced distribution of the data storage drives across the RAID groups providing a significant improvement over the current distribution of the data storage drives across the RAID groups, automatically redistributing the data storage drives across the RAID groups according to the faultiness-balanced distribution of the data storage drives.

8. A data storage system comprising:
at least one storage processor including processing circuitry and a memory;
a plurality of data storage drives communicably coupled to the storage processor; and
wherein the memory has program code stored thereon, wherein the program code, when executed by the processing circuitry, causes the processing circuitry to:
  provide RAID (Redundant Array of Independent Disks) protection for data written into a logical RAID space, wherein data written to the logical RAID space is stored in data storage drives contained in a corresponding RAID group of data storage drives, wherein the logical RAID space is one of a plurality of logical RAID spaces and the RAID group is one of a plurality of RAID groups, wherein data written to each one of the logical RAID spaces is stored in data storage drives contained in a corresponding one of the plurality of data storage drives, calculate a faultiness level of each individual data storage drive in the plurality of RAID groups based on drive health information collected for each one of the data storage drives in the plurality of RAID groups, generate a suitable RAID level for the RAID group based on the faultiness levels of the data storage drives contained in the RAID group, and generate a faultiness-balanced distribution of the data storage drives across the RAID groups based on the faultiness levels of the individual data storage drives, wherein generation of the faultiness-balanced distribution of the faulty data storage drives across the RAID groups includes causing the processing circuitry to:

determine a faultiness-balanced distribution of the data storage drives across the RAID groups that minimizes a range of values of a faultiness metric calculated for the individual RAID groups based on the faultiness levels of the individual data storage drives, and wherein the faultiness metric calculated for each RAID group comprises a size of the RAID group divided by a sum of the faultiness levels of the data storage drives contained in the RAID group.

9. The data storage system of claim 8, wherein the program code, when executed by the processing circuitry, further causes the processing circuitry to:

compare the suitable RAID level for the RAID group to a requested RAID level for the RAID group; and in response to detecting that the suitable RAID level for the RAID group does not match the requested RAID level for the RAID group, generate a message indicating that the RAID level requested for the RAID group does not match the suitable RAID level for the RAID group.

10. The data storage system of claim 8, wherein the program code, when executed by the processing circuitry, further causes the processing circuitry to:

compare the suitable RAID level for the RAID group to a RAID level currently configured to the RAID group; and in response to detecting that the suitable RAID level for the RAID group does not match the RAID level currently configured to the RAID group, generate a message indicating that the RAID level currently configured to the RAID group does not match the suitable RAID level for the RAID group.

11. The data storage system of claim 8, wherein the program code, when executed by the processing circuitry, further causes the processing circuitry to:

automatically configure the RAID group with the suitable RAID level for the RAID group, such that data subsequently written into the corresponding logical RAID space is stored in the RAID group according to the suitable RAID level for the RAID group.

12. The data storage system of claim 8, wherein the program code, when executed by the processing circuitry, further causes the processing circuitry to:

determine whether the faultiness-balanced distribution of the data storage drives across the RAID groups matches a current distribution of the data storage drives across the RAID groups; and in response to the faultiness-balanced distribution of the data storage drives across the RAID groups not matching the current distribution of the data storage drives across the RAID groups, automatically redistribute the data storage drives across the RAID groups according to the faultiness-balanced distribution of the data storage drives.

13. The data storage system of claim 12, wherein the program code, when executed by the processing circuitry, further causes the processing circuitry to automatically redistribute the data storage drives across the RAID groups of data storage drives according to the faultiness-balanced distribution of the data storage drives at least in part by moving at least one of data storage drive from a first one of the RAID groups to a second one of the RAID groups.

14. The data storage system of claim 8, wherein the program code, when executed by the processing circuitry, further causes the processing circuitry to:

determine whether the faultiness-balanced distribution of the data storage drives across the RAID groups provides a significant improvement over a current distribution of the data storage drives across the RAID groups; and in response to the faultiness-balanced distribution of the data storage drives across the RAID groups providing a significant improvement over the current distribution of the data storage drives across the RAID groups, automatically redistribute the data storage drives across the RAID groups according to the faultiness-balanced distribution of the data storage drives.

15. A computer program product including a non-transitory computer readable medium having instructions stored thereon, wherein the instructions, when executed on processing circuitry, cause the processing circuitry to perform the steps of:

providing RAID (Redundant Array of Independent Disks) protection for data written into a logical RAID space, wherein data written to the logical RAID space is stored in data storage drives contained in a corresponding RAID group of data storage drives, wherein the logical RAID space is one of a plurality of logical RAID spaces and the RAID group is one of a plurality of RAID groups, wherein data written to each one of the logical RAID spaces is stored in data storage drives contained in a corresponding one of the plurality of data storage drives;

calculating a faultiness level of each individual data storage drive in the plurality of RAID groups based on drive health information collected for each one of the data storage drives in the plurality of RAID groups;

generating a suitable RAID level for the RAID group based on the faultiness levels of the data storage drives contained in the RAID group; and generating a faultiness-balanced distribution of the data storage drives across the RAID groups based on the faultiness levels of the individual data storage drives, wherein generating the faultiness-balanced distribution of the faulty data storage drives across the RAID groups further comprises:

determining a faultiness-balanced distribution of the data storage drives across the RAID groups that minimizes a range of values of a faultiness metric calculated for the individual RAID groups based on the faultiness levels of the individual data storage drives, and wherein the faultiness metric calculated for each RAID group comprises a size of the RAID group divided by a sum of the faultiness levels of the data storage drives contained in the RAID group.

* * * * *